(12) United States Patent
Naudus et al.

(10) Patent No.: US 6,292,839 B1
(45) Date of Patent: Sep. 18, 2001

(54) METHOD AND SYSTEM FOR REFLEXIVE TUNNELING

(75) Inventors: Stanley T. Naudus, Springfield, VA (US); Vijay Nadkarni, Naperville, IL (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/207,807

(22) Filed: Dec. 9, 1998

(51) Int. Cl.[7] ........................................ G06F 13/00
(52) U.S. Cl. .................. 709/238; 709/236; 709/245; 709/329
(58) Field of Search .................. 709/217, 218, 709/223, 224, 225, 227, 228, 230, 236, 237, 238, 246, 313, 328, 329

(56) References Cited

U.S. PATENT DOCUMENTS

| | | | |
|---|---|---|---|
| 5,805,803 | 9/1998 | Birrell et al. | 713/201 |
| 5,825,891 | 10/1998 | Levesque et al. | 713/153 |
| 5,864,666 | 1/1999 | Shrader | 713/201 |
| 5,935,212 | * 8/1999 | Kalajan et al. | 709/228 |
| 5,941,988 | * 8/1999 | Bhagwat et al. | 713/201 |
| 5,991,299 | * 11/1999 | Radogna et al. | 370/392 |
| 5,999,541 | * 12/1999 | Hinchey et al. | 370/466 |
| 6,041,166 | * 3/2000 | Hart et al. | 395/200.68 |
| 6,104,716 | * 8/2000 | Crichton et al. | 370/401 |

* cited by examiner

*Primary Examiner*—Viet D. Vu
(74) *Attorney, Agent, or Firm*—McDonnell Boehnen Hulbert & Berghoff; Stephen Lesavich

(57) ABSTRACT

A method and system for reflexive tunneling. One aspect of the invention includes a method for reflexive tunneling using hidden virtual tunnels. A first peer application sends data packets to a second peer application and intermediate network devices create a hidden virtual tunnel to send the data packets. The hidden virtual tunnel is "hidden" from the first peer application and the second peer application. The hidden virtual tunnels may allow supplemental services to be added to a network device such as a gateway in less time with less expense. Another aspect of the invention includes a method for reflexive tunneling using transparent virtual tunnels with multiple segments. A first peer application associated with a first network device on a first network with multiple communication channels sends data packets to a second peer application associated with a second network device on a second network over a pre-determined communications channel forming a first segment of transparent virtual tunnel. Intermediate network devices create a second segment of the transparent virtual tunnel, by adding headers to the data packets between the first and second networks. Reflexive tunneling with transparent virtual tunnels with multiple segments between the first and second networks, may allow peer applications on a network device with multiple communication channels on a communication link to communicate with other peer applications on other independent devices without confusion.

22 Claims, 9 Drawing Sheets

METHOD AND SYSTEM FOR REFLEXIVE TUNNELING

FIELD OF INVENTION

The present invention relates to computer networks. More specifically, it relates to a method and system for reflexive tunneling using virtual tunnels.

BACKGROUND OF THE INVENTION

The Internet is a world-wide network of interconnected computers. The Internet Protocol ("IP") is an addressing protocol designed to route traffic within a network or between networks. The Internet Protocol is used on many computer networks including the Internet, intranets and other networks. The Transmission Control Protocol ("TCP") and User Datagram Protocol ("UDP") arc often used with the Internet Protocol.

Transmission Control Protocol provides a connection-oriented, end-to-end reliable protocol designed to fit into a layered hierarchy of protocols that Support multi-network applications. User Datagram Protocol provides a transaction-oriented datagram protocol, where delivery and duplicate packet protection are not guaranteed.

Networks using the Internet Protocol such as the Internet, are often connected to a Public Switched Telephone Network ("PSTN") through a gateway. As is known in the art, a gateway connects computer networks using different networking protocols or operating at different transmission capacities. The public switched telephone network includes those provided by AT&T, Sprint, GTE, MCI and others. Gateways, also called "edge servers" are often used to provide enhanced telephony supplemental services from the public switched telephone network to a network using the Internet Protocol. For example, a gateway may provide adjunct call processing features, billing services, e-mail and other supplemental services between the public switched telephone network and an Internet Protocol network.

The supplemental services on the gateway allow a peer application associated with the public switched telephone network to communicate with a peer application on an Internet Protocol network. For example, a gateway allows an e-mail application associated with a network device on the public switched telephone network to communicate with a peer e-mail application associated with a network device on an Internet Protocol network (e.g., the Internet or an intranet).

Data packets sent between an Internet Protocol network and a public switched telephone network include packet headers that contain information such as source and destination network addresses, source and destination ports, and other information. When a first peer application on the Internet Protocol network sends data packets to a second peer application associated with the public switched telephone network, the gateway examines headers in the data packets and routes them to the second peer application associated with the public switched telephone network. Virtual tunnels are often used by gateways to deliver such data packets. Original data packets may be encapsulated into another data packet so they can be sent through a "virtual tunnel." As is known in the art, a virtual tunnel can be created by encapsulating one data packet inside another.

When supplemental services are added to a gateway, the supplemental services arc often added with custom software. Custom software on the gateway requires a considerable amount of development time, and is typically very expensive. The supplemental services also have to be integrated with existing services on the gateway without affecting the existing services. When supplemental services arc added to gateway, virtual tunnels are often used to add new or additional functionality.

However, there are several problems associated With using virtual tunnels to add new or additional functionality to a gateway or other network devices. Existing applications for supplemental services already in a gateway or other network devices may need to be modified to use the virtual tunnels. The modification of software to use new virtual tunnels is often a time consuming and expensive process and can affect existing services.

Another problem with adding new virtual tunnels is that a network device such as a telephony switch may be associated with several other network devices such as network signaling devices, gateways, etc. The telephony switch is typically connected to the associated devices with many different types of communications links with multiple communications channels. The associated network devices typically do not have the ability to communicate directly with each other, but need to use a communications link with multiple channels to/from the telephony switch. As a result, it is difficult to use a virtual tunnel for new supplemental services between the network devices associated with a communications link with multiple channels.

Thus, it is desirable to aid supplemental services to a gateway or other network device as quickly and as inexpensive as possible using virtual tunnels. The supplemental services should also be added to a gateway or other network device using virtual tunnels without affecting existing services, and useable on a network device over a communications link with multiple channels.

SUMMARY OF THE INVENTION

In accordance with preferred embodiments of the present invention, some of the problems associated with adding supplemental services to network devices such as a gateway are overcome. A method and system for reflexive tunneling is provided. One aspect of the present invention includes a method for reflexive tunneling with hidden tunnels. A hidden virtual tunnel is created by modifying one or more headers in the data packet instead of encapsulating the data packet into another data packet. The modified packet headers also provide connection state information to help send the data packet over the communications channel via a hidden virtual tunnel. The hidden virtual tunnel is "hidden" from peer applications. Thus, the hidden virtual tunnels may allow supplemental services to be added to a network device such as a gateway, in less time with less expense.

Another aspect of the present invention includes a method for encapsulated reflexive tunneling with transparent virtual tunnels. The method includes using a pre-determined communications channel to form a first segment of a transparent virtual tunnel. Additional headers are added to data packets to create a second segment of the transparent virtual tunnel.

Peer applications associated with a network device with a number of communications channels can communicate with another peer application without confusion using transparent virtual tunnels with multiple segments. Thus, the transparent virtual tunnels with multiple segments may allow supplemental services to be added to a network device with a communications link including multiple communications channels.

BRIEF DESCRIPTION OF THE DRAWINGS

Preferred embodiments of the present invention arc described with reference to the following drawings, wherein.

DETAILED DESCRIPTION OF PREFERRED EMBODIMENTS

Exemplary Network System

Figure 1:
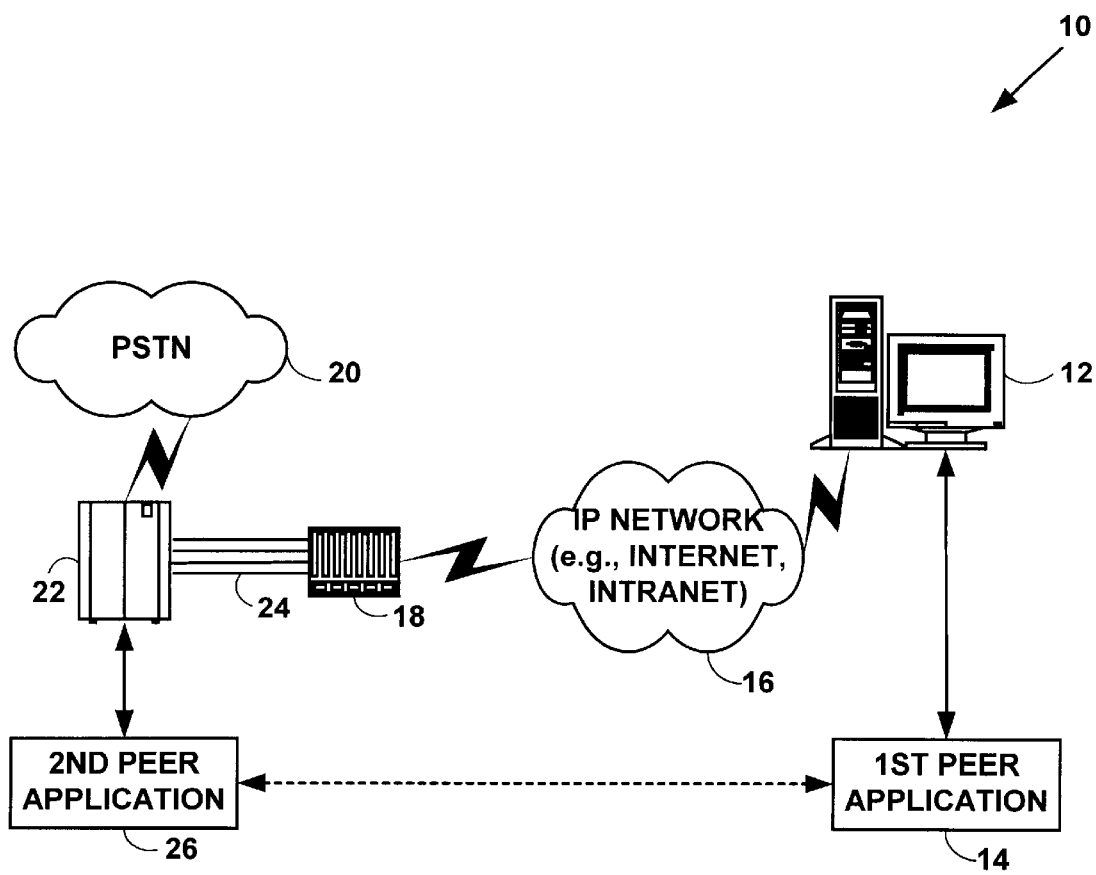
FIG. 1 is a block diagram illustrating a network system for reflexive tunneling.

FIG. 1 is a block diagram illustrating a network system 10 for reflexive tunneling. The network system includes a first network device 12 associated with a first peer application 14 on a first network 16. The first network device 12 is in communications with a second network device 18 on a second network 20. The second network device 18 is connected to a third network device 22 with over a connection 24 with multiple communications channels. The third network device 22 is associated with a second peer application 26. The first peer application 14 and the second peer application 26 are illustrated as applications external to first network device 12 and third network device 22, respectively. However, the first peer application 14 and the second peer application 26 may also be integral to the first network device 12 or the third network device 22, respectively.

In one preferred embodiment of the present invention, the first network device 12 is a computer, the second network device 18 is an edge server, and the third network device is a telephony switch 22. The edge server is also called an "enhanced gateway," a "remote access server" or a "network access server." In one preferred exemplary embodiment of the present invention, the second network device 18, or edge server, is a Total Control Telephony Hub by 3Com Corporation of Santa Clara, Calif. An exemplary second network device 18 is described in U.S. Pat. No. 5,528,595, granted to Dale M. Walsh et al., and incorporated herein by reference. However, other edge servers could also be used including those by Lucent Technologies of Murray Hill, N.J., Livingston Enterprises, Inc. of Pleasanton, Calif., Ascend Communications of Alameda, Calif. and others. The telephony switch is any of those provided by Siemens A. G., of Munich Germany, Lucent Technologies, of Murray Hill, N.J., Nortel, of Brampton, Ontario, Canada and others.

In one preferred embodiment of the present invention, the first network 16 is the Internet, an intranet or other network using the Internet Protocol. As is known in the art, the Internet Protocol ("IP") is an addressing protocol designed to route traffic within a network or between networks. The Internet Protocol ("IP") is described in Internet Engineering Task Force ("IETE") Request-For-Comments ("RFC")-791, incorporated herein by reference. The second network 20 is a Public Switched Telephone Network ("PSTN"), such as those provided by AT&T, Sprint, MCI, GTE and others.

However, other network devices, network types and network components can also be used and the present invention is not limited to the network devices, network types and network components described and illustrated in FIG. 1. In addition, although illustrated with three network devices, the network system 10 typically includes hundreds of network devices.

An operating environment for network devices of a preferred embodiment the present invention include a processing system with at least one high speed Central Processing Unit ("CPU") and a memory system. In accordance with the practices of persons skilled in the art of computer programming, the present invention is described below with reference to acts and symbolic representations of operations or instructions that are performed by the processing system, unless indicated otherwise. Such acts, operations or instructions are referred to as being "computer-executed" or "CPU executed." Although described with one CPU, alternatively multiple CPUs may be used for a preferred embodiment of the present invention.

The memory system may include main memory and secondary storage. The main memory is high-speed random access memory ("RAM"). Main memory can include any additional or alternative high-speed memory device or memory circuitry. Secondary storage takes the form of long term storage, such as Read Only Memory ("ROM"), optical or magnetic disks, organic memory or any other volatile or non-volatile mass storage system. Those skilled in the art will recognize that the memory system can comprise a variety and/or combination of alternative components.

It will be appreciated that the acts and symbolically represented operations and instructions include the manipulation of electrical signals by the CPU. The electrical signals cause transformation of data bits. The maintenance of data bits at memory locations in a memory system thereby reconfigures or otherwise alters the CPU's operation. The memory locations where data bits are maintained are physical locations that have particular electrical, magnetic, optical, or organic properties corresponding to the data bits.

The data bits may also be maintained on a computer readable medium including magnetic disks, optical disks, organic disks and any other volatile or non-volatile mass storage system readable by the CPU. The computer readable medium includes cooperating or interconnected computer readable medium, which exist exclusively on the processing system or may be distributed among multiple interconnected processing systems that may be local or remote to the processing system.

Reflexive Tunneling with Hidden Virtual Tunnels

Figure 2:
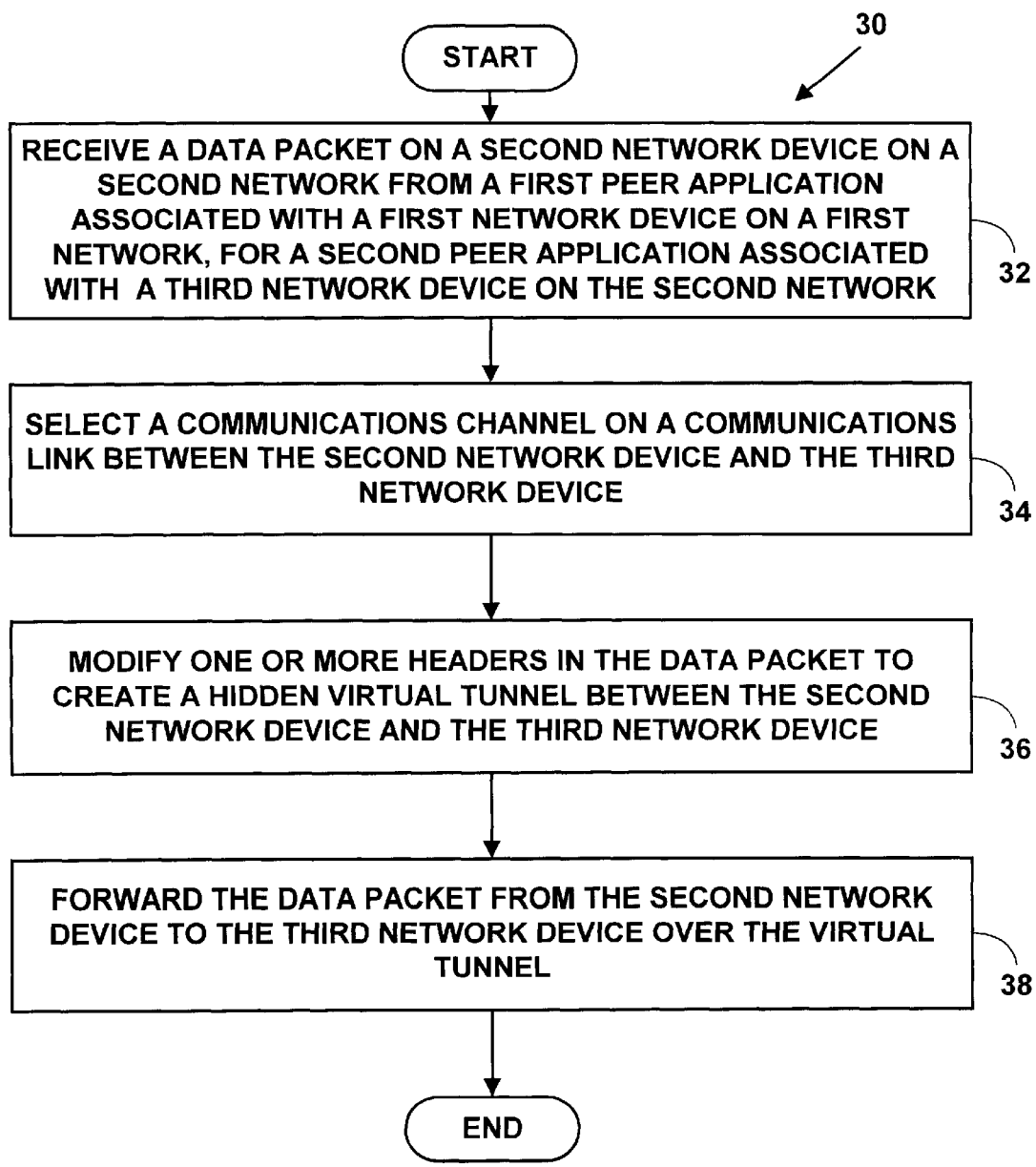
FIG. 2 is a flow diagram illustrating a method for reflexive tunneling with hidden virtual tunnels.

FIG. 2 is a flow diagram illustrating a method 30 for reflexive tunneling with hidden tunnels. At step 32, a data packet is received on a second network device 18 on a second network 20, from a first peer application 14 associated with a first network device 12 on a first network 16, for a second peer application 26 associated with a third network device 22 on the second network 20. At step 34, a communications channel is selected on a communications link 24 between the second network device 18 and the third network device 22.

At step 34, one or more headers in the data packet are modified on the second network device 18 (e.g., with a hidden tunnel application) to create a hidden virtual tunnel between the second network device 18 and the third network device 22. The one or more modified headers provide communication state information including network address, network port, selected communications channel, and other state information. The hidden virtual tunnel is created by modifying header information in a data packet instead of encapsulating a data packet inside another data packet. The hidden virtual tunnel is "hidden" from the first peer application 14 associated with the first network device 12 and is also "hidden" from the second peer application 26 associated with the third network device 22. At step 38, the data packet is forwarded from the second network device 1 8 to the third network device 22 over the hidden virtual tunnel over the selected communication channel.

As is known in the art, a virtual tunnel can be created by encapsulating a data packet inside another data packet. For example, an outer header is added before an inner header of a data packet. The outer header identifies the "endpoints" of the tunnel. The inner header identifies the original sender and recipient of the data. Virtual tunnels are often created using IP-in-IP packet encapsulation. For more information on virtual tunneling using IP-in-IP packet encapsulation, see RFC-1853, incorporated herein by reference. Most virtual tunnels known in the art are used without modifying headers in an original data packet. However, in one preferred embodiment of the present invention, a hidden virtual tunnel is created by modifying one or more headers in original data packets. Modifying headers in original data packets, allow a hidden virtual tunnel to be created.

In one preferred embodiment of the present invention, a User Datagram Protocol ("UDP") in an IP protocol packet is received at step 32. However, other protocols could also be used (e.g., Transmission Control Protocol) and the present invention is not limited to UDP packets in IP data packets. As is known in the art, UDP provides a connectionless mode of communications with datagrams in an interconnected set of computer networks. UDP provides a transaction-oriented datagram protocol, where delivery and duplicate packet protection are not guaranteed. For more information on UDP, see RFC-768, incorporated herein by reference.

Figure 3:
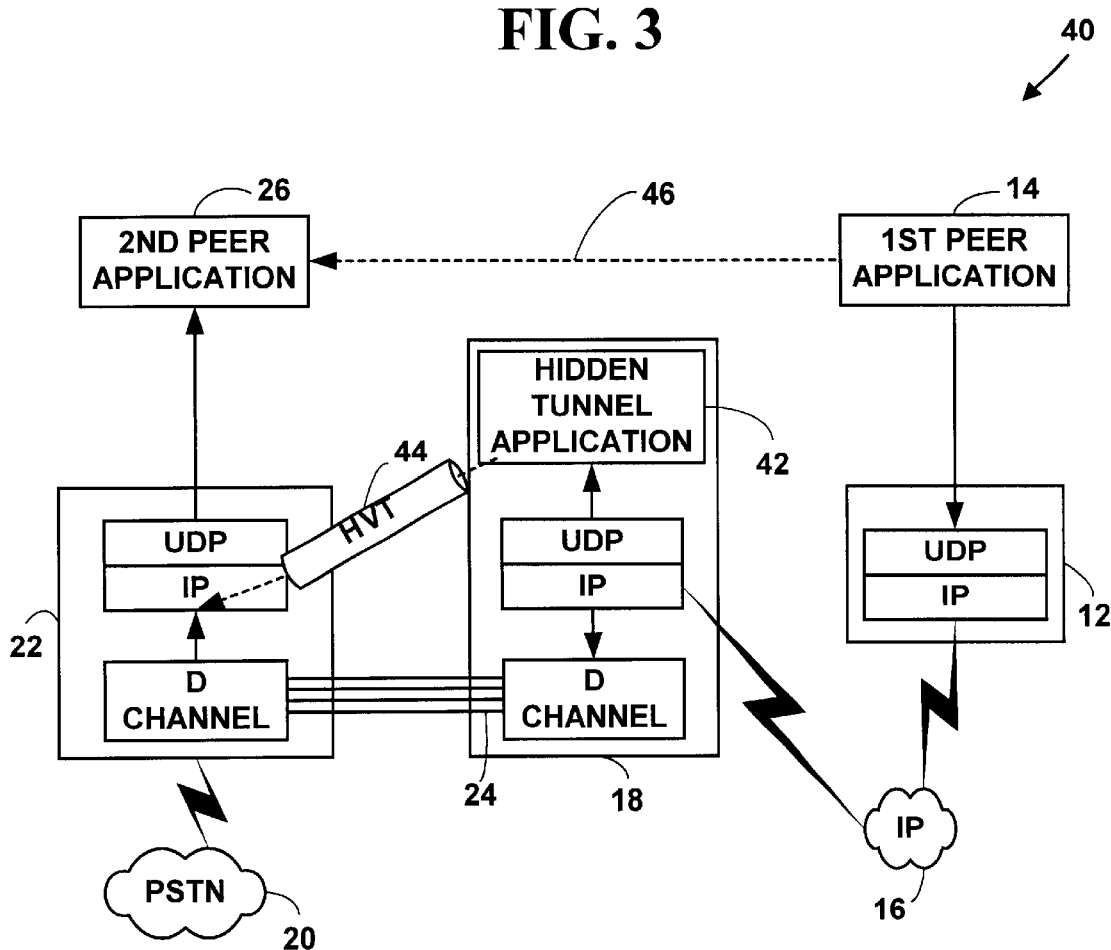
FIG. 3 is a block diagram illustrating an exemplary data flow for reflexive tunneling with hidden virtual tunnels.

FIG. 3 is a block diagram illustrating an exemplary data flow 40 for encapsulated reflexive tunneling using Method 30 (FIG. 2). Table 1 illustrates an exemplary UDP/IP data packet sent from the first peer application 14 associated with the first network device 12 to the second network device 18, at Step 32. However, other data packet layouts and other protocols could also be used and the present invention is not limited to UDP/IP packets.

TABLE 1

| IP header | | UDP header | | Data |
|---|---|---|---|---|
| Destination IP address of second network device 18 | Source IP address of first network device 12 | Destination UDP port 'P2' of a hidden tunnel application 42 on second network device 18 | Source UDP port 'P1' of 1st Peer application 14 | (e.g., e-mail) |

A network address for the third network device 22 and a network port for the second peer application are 26 selected by the first peer application 14 from a "published" list of network addresses and network ports (e.g., routing or address resolution tables). The first peer application 14 addresses a data packet with the selected network address (e.g., IP address) for the third network device 22 and the selected network port (e.g., UDP port) for the second peer application 26 on the third network device 22.

However, the network port published for the second peer application 26 is actually the address of a hidden tunnel application 42 (FIG. 3) on the second network device 18. The network address published for the third network device 22 is actually a network address for the second network device 18. Thus, a hidden tunnel application 42 (FIG. 3) on the second network device 18 will receive the data packet at Step 32 instead of the second peer application 26 on the third network device 22. The second network device 18 forwards data packets to the actual endpoint (i.e., the second peer application 26) using a hidden virtual tunnel 44 (FIG. 3) created by the hidden tunnel application 42. The hidden virtual tunnel 44 is created by modifying one or more headers in the data packet instead of encapsulating a data packet in another data packet.

At step 34, a communications channel is selected between the second network device 18 and the third network device 22. In one exemplary preferred embodiment of the present invention, the communications channel is an Integrated Services Digital Network ("ISDN") D-channel. However, other communications channels (e.g., SS7) could also be used and the present invention is not limited to ISDN D-channels. In one preferred embodiment of the present invention, the communication channels on the communication link 24 are assigned a network address (e.g., an IP address) to uniquely identify the communication channels and allow data packets to be routed (e.g., with IP).

At step 36, one or more headers in the data packet are modified on the second network device 18 with a hidden tunnel application 42 (FIG. 3) to create a hidden virtual tunnel 44 (FIG. 3) between the second network device 18 and the third network device 22. The one or more modified headers provide communication state information. The communication state information includes network address, network port, selected communication channel and other state information.

Table 2 illustrates an exemplary UDP/IP data packet modified at Step 36. A hidden application 42 (FIG. 3) is used to create the hidden virtual tunnel 44 (FIG.3). However, other applications, data packet layouts and other protocols could also be used.

TABLE 2

| IP header | | UDP header | | Data |
|---|---|---|---|---|
| Modified destination IP address of selected communications channel 24 | Source IP address of first network device 12 | Modified destination UDP port 'P3' of 2nd peer application 26 | Source UDP port 'P1' of 1st Peer application 14 | (e.g., e-mail) |

The modified data packet illustrated in Table 2 includes a modified IP header that has a modified destination IP address for a communications channel selected at Step 34. The communication channel connects the third network device 22 and the second network device 18. The modified data packet also has a modified UDP header that includes a modified destination UDP port for the second peer application 26.

At Step 38, the data packet is forwarded from the second network device 18 to the third network device 22 over the hidden virtual tunnel 44 using the selected communication channel. Table 3 illustrates an exemplary UDP/IP data packet sent over the hidden virtual tunnel 44 (FIG. 3) and the communications channel selected at Step 34. However, data packet layouts and other protocols could also be used.

TABLE 3

| Communications Channel Header | IP Header | | UDP Header | | Data |
|---|---|---|---|---|---|
| (e.g., D-channel) | Destination IP address of selected communications channel 24 | Source IP address of first network device 12 | Destination UDP port 'P3' of 2nd Peer application 26 | Source UDP port 'P1' of 1st peer application 14 | (e.g., e-mail) |

FIG. 3 illustrates a virtual data flow path 40. However, the actual data flow path followed is from the hidden tunnel application 42 on the second network device 18 through a first UDP/IP stack, over a D-channel on connection 24 to a second UDP/IP stack on the third network device 22.

When the third network device 22 receives the data packet over the hidden virtual tunnel 44 (FIG. 3) at the other end of the selected communications channel, the communications channel header is stripped off leaving the data packet illustrated in Table 2. The third network device 22 forwards the data packet to the second peer application 26.

The second peer application 26 examines the data packet and determines it was sent "directly" 46 (FIG. 3) from the first peer application 14 on the first network device 12. The second peer application 26 cannot "determine" the data packet was forwarded over the hidden virtual tunnel 44 between the second network device 18 and the third network device 22.

Method 50 allows a hidden virtual tunnel to be created by modifying one or more headers in a data packet. The hidden virtual tunnel allows peer applications on different types of network devices to communicate without extensive modifications to existing software on a network device (e.g., a gateway) associated with a peer application.

Figure 4:
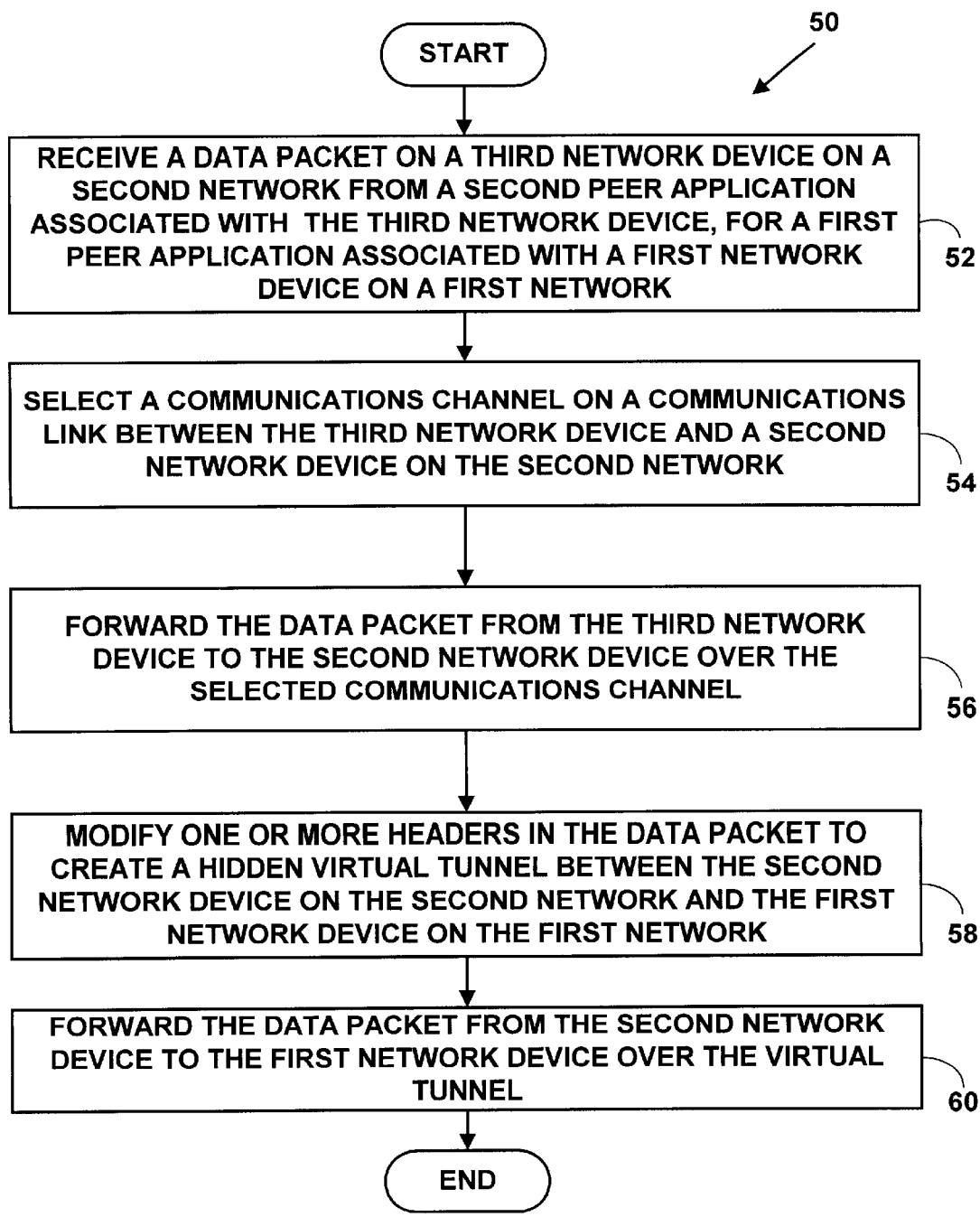
FIG. 4 is a flow diagram illustrating a method for reflexive tunneling with hidden virtual tunnels.

FIG. 4 is a flow diagram illustrating a method 50 for reflexive tunneling with hidden tunnels. At Step 52, a data packet is received on a third network device 22 on a second network 20, from a second peer application 26 associated with the third network device 22, for a first peer application 14 associated with a first network device 12, on a first network 16. At Step 54, communications channel is selected on a communications link 24 between the third network device 22 and the second network device 18 on the second network 20. At Step 56, the data packet is forwarded from the third network device 22 to the second network device 18 over the selected communications channel. At Step 58, one or more destination headers in the data packet are modified on the second network device 18 (e.g., with a hidden tunnel application) to create a hidden virtual tunnel between the second network device 18 on the second network 20 and the first network device 12 on the first network 16. The one or more modified headers also provide communication state information as described above. The hidden virtual tunnel is hidden from the second peer application 26 associated with the third network device 22 and the first peer application 14 associated with the first network device 12. At Step 60, data packet is forwarded from the second network device 18 to the first network device 12 over the hidden virtual tunnel.

Figure 5:
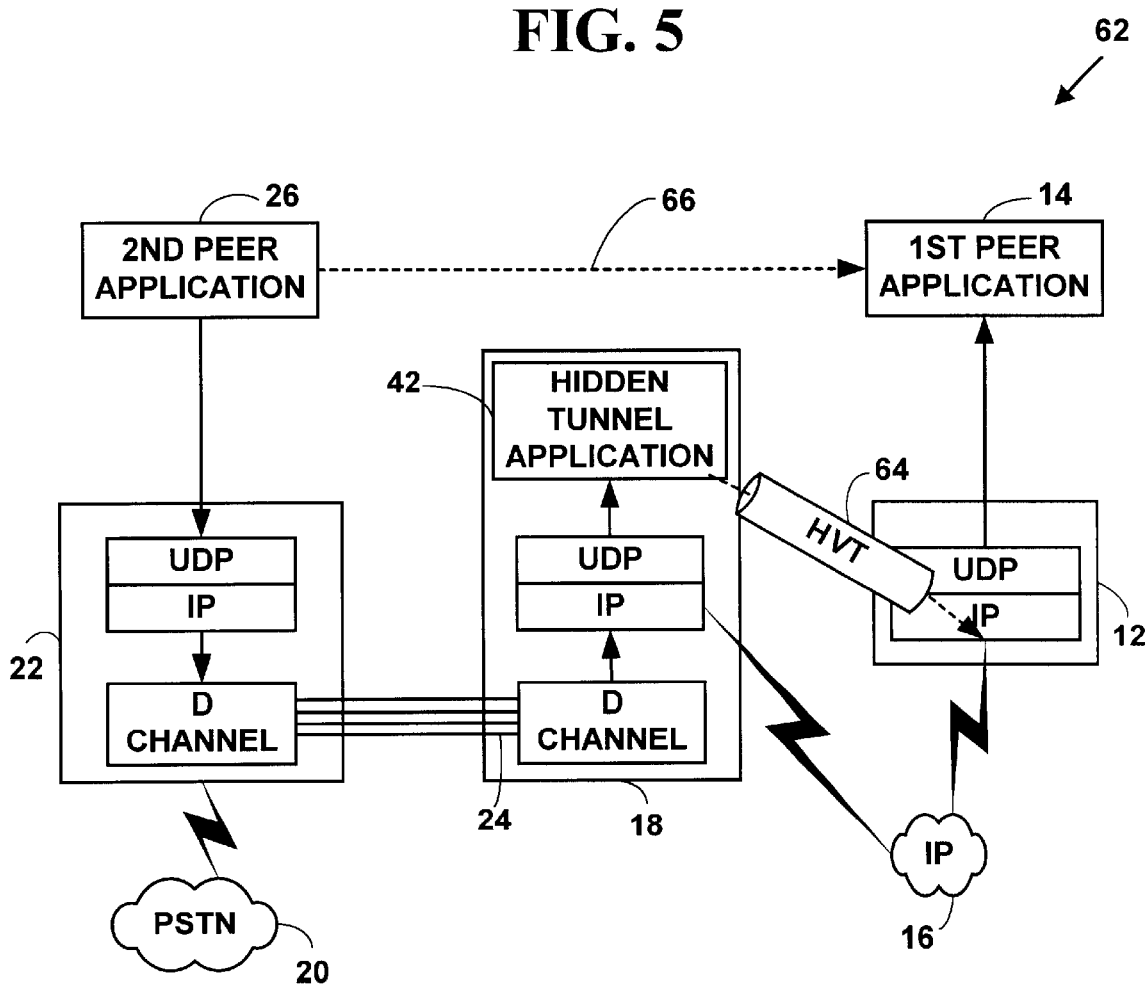
FIG. 5 is a block diagram illustrating an exemplary data flow for reflexive tunneling with hidden virtual tunnels.

FIG. 5 is a block diagram illustrating an exemplary data flow 62 for reflexive tunneling with hidden virtual tunnels using Method 50. Table 4 illustrates an exemplary UDP/IP data packet sent from the second peer application 26 on the third network device at Step 52 for one exemplary preferred embodiment of the present invention. However, other data packet layouts and other protocols could also be used.

TABLE 4

| IP header | | UDP header | | Data |
|---|---|---|---|---|
| Destination IP address of first network device 12 | Source IP address of selected communications channel on connection 24 | Destination UDP port 'P1' of 1st peer application 14 | Source UDP port 'P3' of 2nd peer application 26 | (e.g., e-mail) |

The second peer application 26 addresses a UDP over IP packet for a destination network address for the first network device 12 and a destination network port for the first peer application 14. The source network address is the network address of a communications channel on the connection 24 between the third network device 22 and the second network device 18. The source network port is a network port for the second peer application 26.

At step 54, a communications channel is selected between the third network device 22 and second network device 18. In one exemplary preferred embodiment of the present invention, the communications channel is an Integrated Services Digital Network ("ISDN") D-channel. However, other communications channels (e.g., SS7) could also be used and the present invention is not limited to ISDN D-channels. In a preferred embodiment of the present invention, the communication channels are assigned a network address (e.g., an IP address) to uniquely identify the communications channel.

In one preferred embodiment of the present invention, the selected communications channel is a communications channel associated with a source network address for a communications channel from a header in the data packet. In such an embodiment, the network address in the header in data packet of the communications channel is used to return responses to the second peer application. In another preferred embodiment of the present invention, the communication channel selected is different from the communication channel associated with a network address in a header in the data packet.

Table 5 illustrates an exemplary UDP/IP data packet sent from the third network device 22 to the second network device 18 over the selected communications channel. However, other data packet layouts and other protocols could also be used.

TABLE 5

| Communications Channel Header | IP Header | | UDP Header | | Data |
|---|---|---|---|---|---|
| (e.g., D-channel) | Destination IP address of first network device 12 | Source IP address of a selected communications channel on connection 24 | Destination UDP port 'P1' of $1^{st}$ peer application 14 | Source UDP port 'P3' of $2^{nd}$ peer application 26 | (e.g., e-mail) |

At Step 56, the data packet is forwarded from the third network device 22 to the second network device 18 over the selected communications channel. The second network device 18 strips the communications channel header leaving the data packet from Table 4.

At Step 58, one or more destination headers in the data packet are modified on the second network device 18 (e.g., modified by a hidden tunnel application) to create a hidden virtual tunnel 64 (FIG. 5) between the second network device 18 on the second network 20 and the first network device 12 on the first network 16.

Table 6 illustrates an exemplary UDP/IP data packet modified at step 58 and used to create the hidden virtual tunnel 64 (FIG. 5). However, other data packet layouts and other protocols could also be used.

TABLE 6

| IP header | | UDP header | | Data |
|---|---|---|---|---|
| Destination IP address of first network device 12 | Modified Source IP address of second network device 18 | Destination UDP port 'P1' of $1^{st}$ peer application 14 | Modified Source UDP Port 'P3' of hidden tunnel application 42 | (e.g., e-mail) |

The hidden tunnel application 42 (FIG. 5) on the second network device 18 modifies the source network address in the IP header to include the network address of the second network device 18. The hidden tunnel application 42 (FIG. 5) also modifies the source network port to include the network port for the hidden tunnel application 42. The network address of the second network device 18 and the network port for the hidden tunnel application 42 are the network address and network port "published" (e.g., in routing tables or address resolution tables) for the third network device 22 and the second peer application 26, respectively for use on the first network 16. Thus, the first peer application 14 will address response data packets using the network address and network port "published" for the third network device 22 and the second peer application 26, respectively that are actually a network address for the second network device 18 and a network port for the hidden tunnel application 42.

At Step 60, data packet is forwarded from the second network device 18 to the first network device 12 over the hidden virtual tunnel 64 (FIG. 5). The first network device 12 forwards the data packet to the first peer application 14.

The first peer application 14 examines the data packet and determines it was sent "directly" 66 (FIG. 5) from the second peer application 26 on the third network device 22. The first peer application 14 cannot "determine" the data packet was forwarded over the hidden virtual tunnel 64 created between the second network device 18 and the first network device 12 over the first network 16.

Method 30 and Method 50 modifies headers in data packets to provide hidden virtual tunneling without packet-in-packet encapsulation. The virtual tunnel is hidden from peer applications. Thus, the hidden virtual tunnel used with Method 30 and Method 50 may decrease the time required to develop new features for a gateway with enhanced telephony services.

Reflexive Tunneling with Transparent Virtual Tunnels

In another embodiment of the present invention, reflexive tunneling with transparent virtual tunneling is used. Reflexive tunneling with transparent virtual tunneling allows peer applications associated with a network device that may include multiple communications channels on a communications link to communicate with other peer applications on other network devices.

For example, a telephony switch with an edge server switch may be associated with a telephony e-mail application on an e-mail server. However, the present invention is not limited to peer e-mail applications, and other peer applications can also be used. The peer e-mail applications are exemplary only.

The telephony e-mail application communicates with a peer e-mail application on a personal computer. The telephony e-mail application on the e-mail server can be reached by a number of communications channels through the telephony switch, typically via a gateway. The peer e-mail application on the personal computer needs to respond to the peer telephony e-mail application over a pre-determined communications channel used by the telephony e-mail server via the gateway, since the telephony e-mail server and the and the telephony switch can communicate over a number of different communications links.

Figure 6:
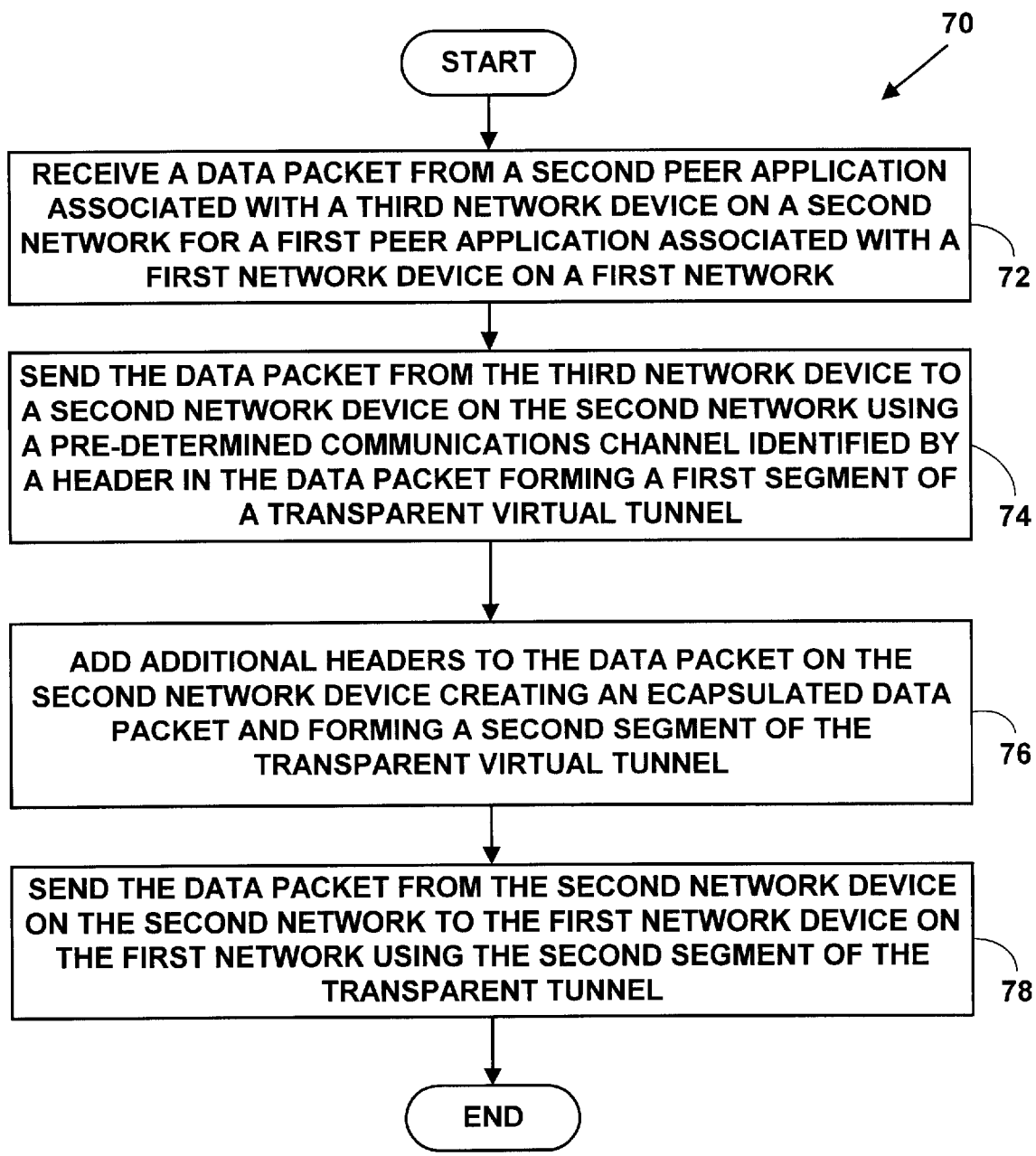
FIG. 6 is a flow diagram illustrating a method for reflexive tunneling with transparent virtual tunnels.

FIG. 6 is a flow diagram illustrating a Method 70 for reflexive tunneling with transparent virtual tunneling. At step 72, a data packet is received from a second peer application 26 associated with a third network device 22 on a second network 20, for a first peer application 14 associated with a first network device 12 on a first network 16. A header in the data packet includes a network address for a pre-determined communications channel on a communications link 24 between the third network device 22 and a second network device 18 on which the data packet is to be sent and on which responses are to be received. At Step 74, the data packet is sent from the third network device 22 to a second network device 18 on the second network 20 over the pre-determined communications channel between the third network device 22 and the second network device 18 identified by the network address included in the header in the data packet. The pre-determined communications channel forms a first segment of a transparent virtual tunnel.

At Step 76, additional headers are added to the data packet on the second network device 18 (e.g., with a transparent tunnel application) to create a second segment of the transparent virtual tunnel between the second network device 18 on the second network 20 and the first network device 12 on the first network 16. At Step 78, the data packet is sent from the second network device 18 to the first network device 12 using the second segment of transparent virtual tunnel. The First network device 18 forwards the data packet to the first peer application 14.

The transparent virtual tunnel with multiple segments allows peer applications associated with the third network device 22 (e.g., a telephony switch) to communicate with a peer application on the first network device 21 via the second network device 18 (e.g., a gateway), even though the third network device 22 has multiple communications channels on the communications link 24 to the second network device 18. Reflexive tunneling with transparent virtual tunneling with multiple segments may allow supplementary services to be added to a network device that may include a communications link with multiple communication channels quicker and cheaper, thereby reducing overall development costs.

Figure 7:
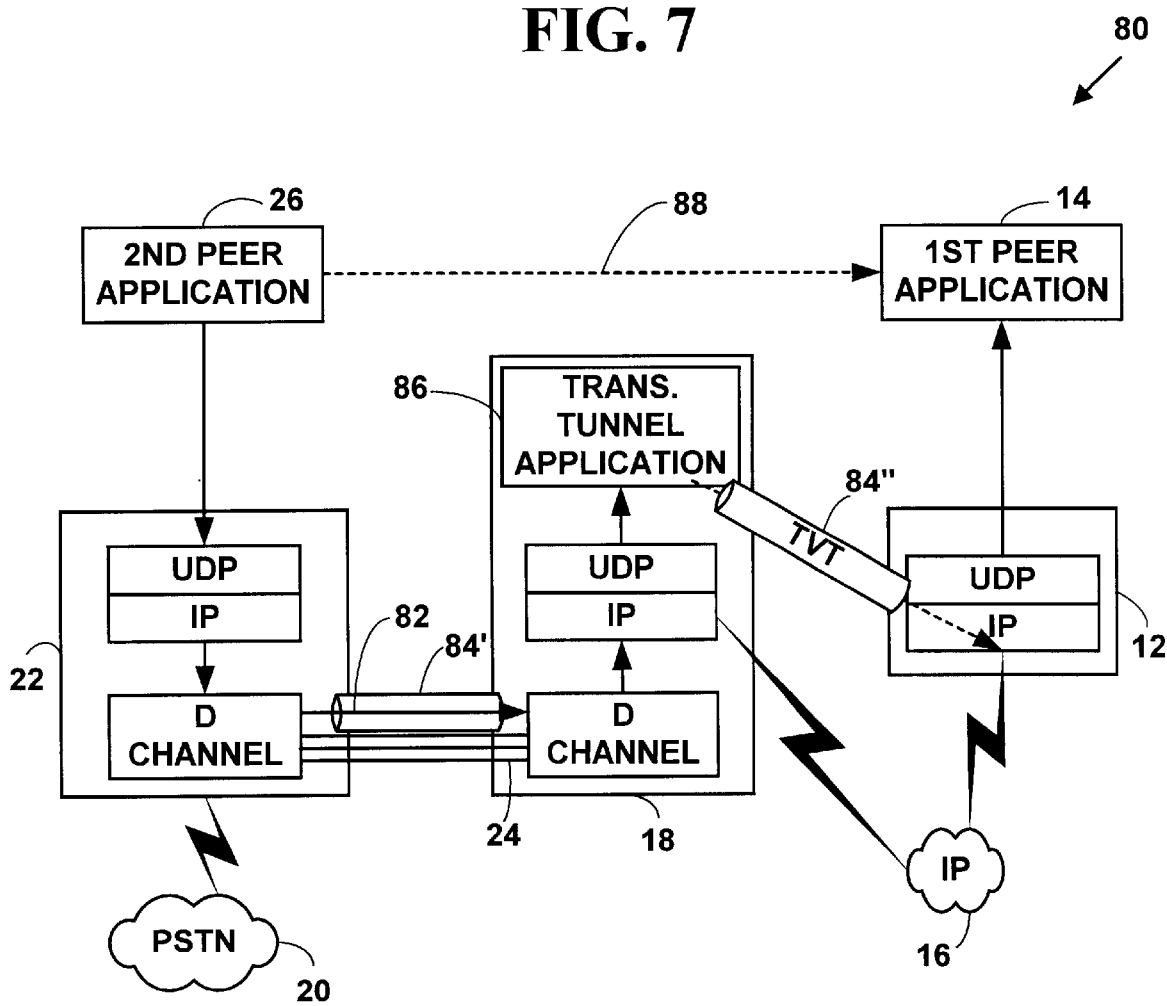
FIG. 7 is a block diagram illustrating an exemplary data flow for reflexive tunneling with transparent virtual tunnels.

FIG. 7 is a block diagram illustrating an exemplary data flow 80 for reflexive tunneling with transparent virtual tunnels using Method 70 (FIG. 6). At step 72, a data packet is received from a second peer application 26 associated with a third network device 22 on a second network 20, for a first peer application 14 associated with a first network device 12 on a first network 16.

Table 7 illustrates an exemplary UDP/IP data packet received from the second peer application on the third network device 22. However, other data packet layouts and other protocols could also be used.

TABLE 7

| IP header | | UDP header | | Data |
|---|---|---|---|---|
| Destination IP address Of first network device 12 | Source IP address of pre-determined communications channel 82 | Destination UDP port 'P1' of 1st peer application 14 | Source UDP port 'P3' of 2nd Peer application 26 | (e.g., e-mail) |

At Step 74, the data packet is sent from the third network device 22 to a second network device 18 on the second network 20 over the pre-determined communications channel 82 between the third network device 22 and the second network device 18 identified by the network address (e.g., IP address) included in the header in the data packet (Table 7). The pre-determined communications channel forms a first segment 84' of a transparent virtual tunnel (FIG. 7)

Table 8 illustrates an exemplary UDP/IP data packet sent from the third network device 22 to the second network device 12 over the pre-determined communications channel 82 and the first segment 84' if the transparent virtual tunnel. However, other data packet layouts and other protocols could also be used.

TABLE 8

| Communications Channel Header | IP Header | | UDP Header | | Data |
|---|---|---|---|---|---|
| (e.g., D-channel) | Destination IP address of first network device 12 | Source IP address of pre-determined communications channel 82 | Destination UDP port 'P1' of 1st peer application 14 | Source UDP port 'P3' of 2nd peer application 26 | (e.g., e-mail) |

In one exemplary preferred embodiment of the present invention, the communications channel is an Integrated Services Digital Network ("ISDN") D-channel. In one exemplary preferred embodiment of the present invention, the communications channel is assigned. A network address (e.g., an IP address) to uniquely identify the communications channel. However, other communications channels (e.g., SS7) could also be used and the present invention is not limited to ISDN D-channels. When the second network device 12 receives the data packet over the pre-determined communications channel 82, the communications channel header is stripped off leaving the data packet illustrated in Table 7.

At Step 76, additional headers are added to the data packet on the second network device 18 (e.g., with a transparent tunnel application 86 (FIG. 7)) to create a second segment 84" of the transparent virtual tunnel (FIG. 7) between the second network device 18 on the second network and the first network device 12 on the first network 16.

Table 9 illustrates an exemplary transparent virtual tunnel segment using IP-in-IP data packet encapsulation sent from second network device 18 to first network device 12 over the second segment 84" of the transparent virtual tunnel. However, other data packet layouts and other protocols could also be used. In addition, the present invention is not limited to IP-in-IP tunneling and other virtual tunneling protocols could also be used.

TABLE 9

| Transparent Tunnel IP header | | Transparent Tunnel UDP header | | Tunneled IP packet data |
| --- | --- | --- | --- | --- |
| Destination IP address of first network device 12 | Source IP address of second network device 18 | Destination UDP port 'P1' of 1st peer application 14 | Source UDP Port 'P4' of transparent virtual tunnel application 86 | Data packet as illustrated by Table 7 |

The data packet for the transparent virtual tunnel illustrated in Table 9 includes a source network address for the second network device 18. The data packet also includes a source network port for the transparent virtual tunnel application 86. The destination of the packet is still the first peer application 14 associated with the first network device 12 on the first network. The tunneled IP packet data illustrated in Table 9 (i.e., for the second segment 84" of the transparent virtual tunnel) includes the data packet illustrated in Table 7, which includes a source network address for the predetermined communications channel 82 (i.e., the first segment 84' of the transparent virtual tunnel) and a source network port for the second peer application 26.

At Step 78, the data packet is sent from the second network device 18 to the first network device 12 over the second segment 84" of transparent virtual tunnel. When the first network device 12 receives the data packet illustrated in Table 9, the transparent virtual tunnel header for the second segment 84 is stripped off leaving the data packet illustrated in Table 7. The first network device 18 forwards the data packet illustrated in Table 7 to the first peer application 14.

Since the data packet received by the first peer application 14 includes a source network address for the pre-determined communications channel 82 and a source network port for the second peer application 26, the first peer application 14 can respond to the second peer application 26 using the pre-determined communications channel 82 from the first segment 84' of the transparent tunnel and an encapsulated virtual tunnel on a second segment 84' of the transparent virtual tunnel. Thus, peer applications associated with a network device with multiple of communications channels on a communications link can communicate "directly" 88 (FIG. 7) with another peer application without confusion over communications channels using a transparent virtual tunnel with multiple segments.

Figure 8:
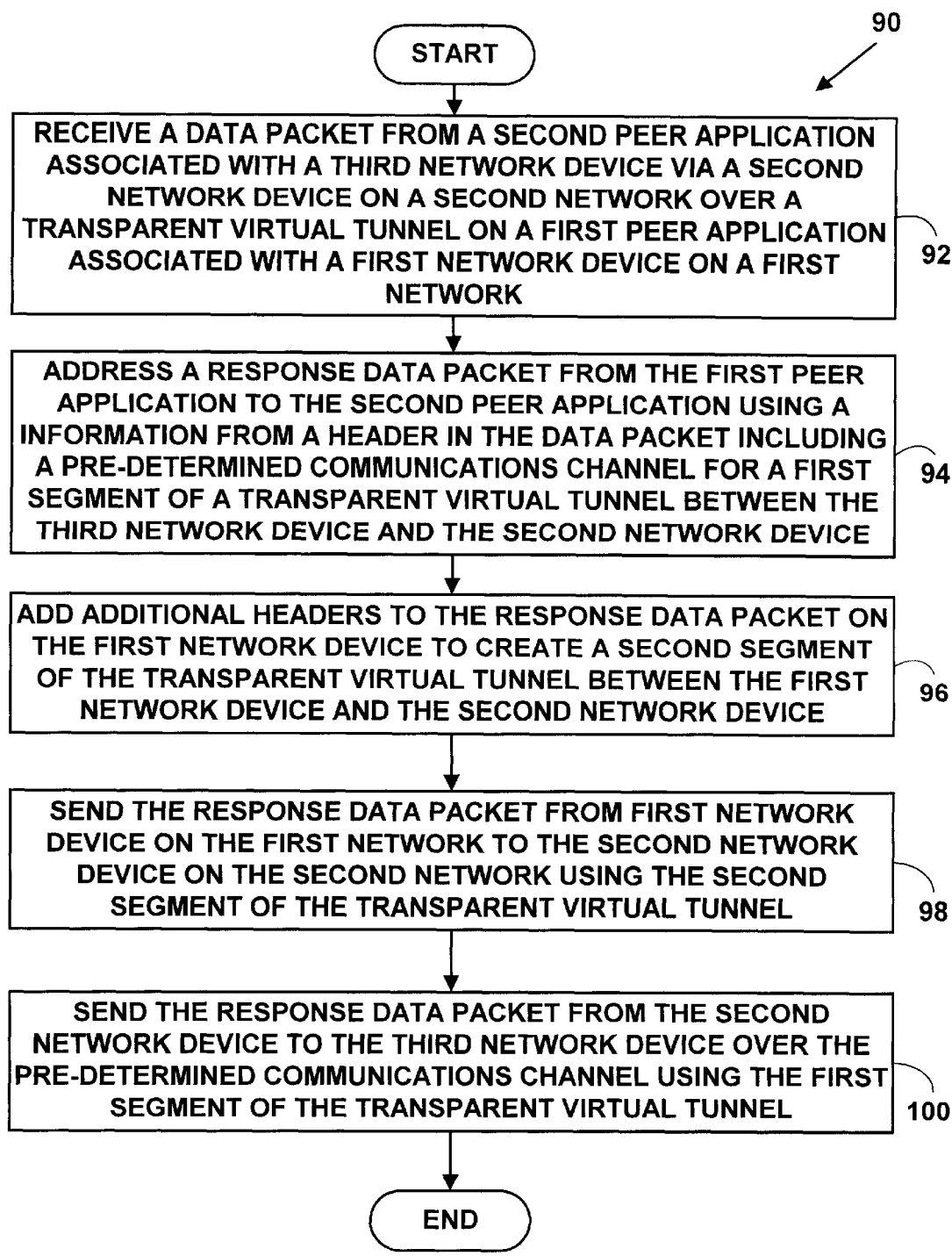
FIG. 8 is a flow diagram illustrating a method for reflexive tunneling with transparent virtual tunnels.

FIG. 8 is a flow diagram illustrating a Method 90 for reflexive tunneling with transparent virtual tunnels. At Step 92, a data packet is received from a second peer application 26 associated with a third network device 22 via a second network device 18 over a transparent virtual tunnel, on a first peer application 14 associated with a first network device 12 on a first network 16. At step 94, a response data packet is addressed on the first peer application 14 associated with the first network device 12 on the first network 16, to the second peer application 26 associated with the third network device 22, on the second network 20. A destination network address in a header for the response data packet is a pre-determined communications channel between the third network device 22 and a second network device 18 on the second network 20 from a header for the data packet. The pre-determined communications channel forms a first segment of a transparent virtual tunnel. A network port in a header for the response data packet is a network port for the second peer application 26.

At step 96, additional headers are added to the response data packet on the first network device 12 (e.g., with a transparent tunnel application) to create a second segment of the transparent virtual tunnel between the first network device 12 on the first network 16 and the second network device 18 on the second network 20. The transparent virtual tunnel with multiple segment allows the first peer application 14 associated with the first network device 12 on the first network 16 to communicate with the second peer application 26 associated with the third network device 22 on the second network 20 via the second network device 18 through a transparent virtual tunnel with multiple segments.

At step 98, the response data packet is sent from the first network device 12 to the second network device 18 over the second segment of the transparent virtual tunnel. At step 100, the response data packet is sent from the second network device 18 to the third network device 22 using the pre-determined communications channel 82 from a header for the response data packet over a first segment of the transparent virtual tunnel. The third network device 22 forwards the response data packet to the second peer application 26.

Figure 9:
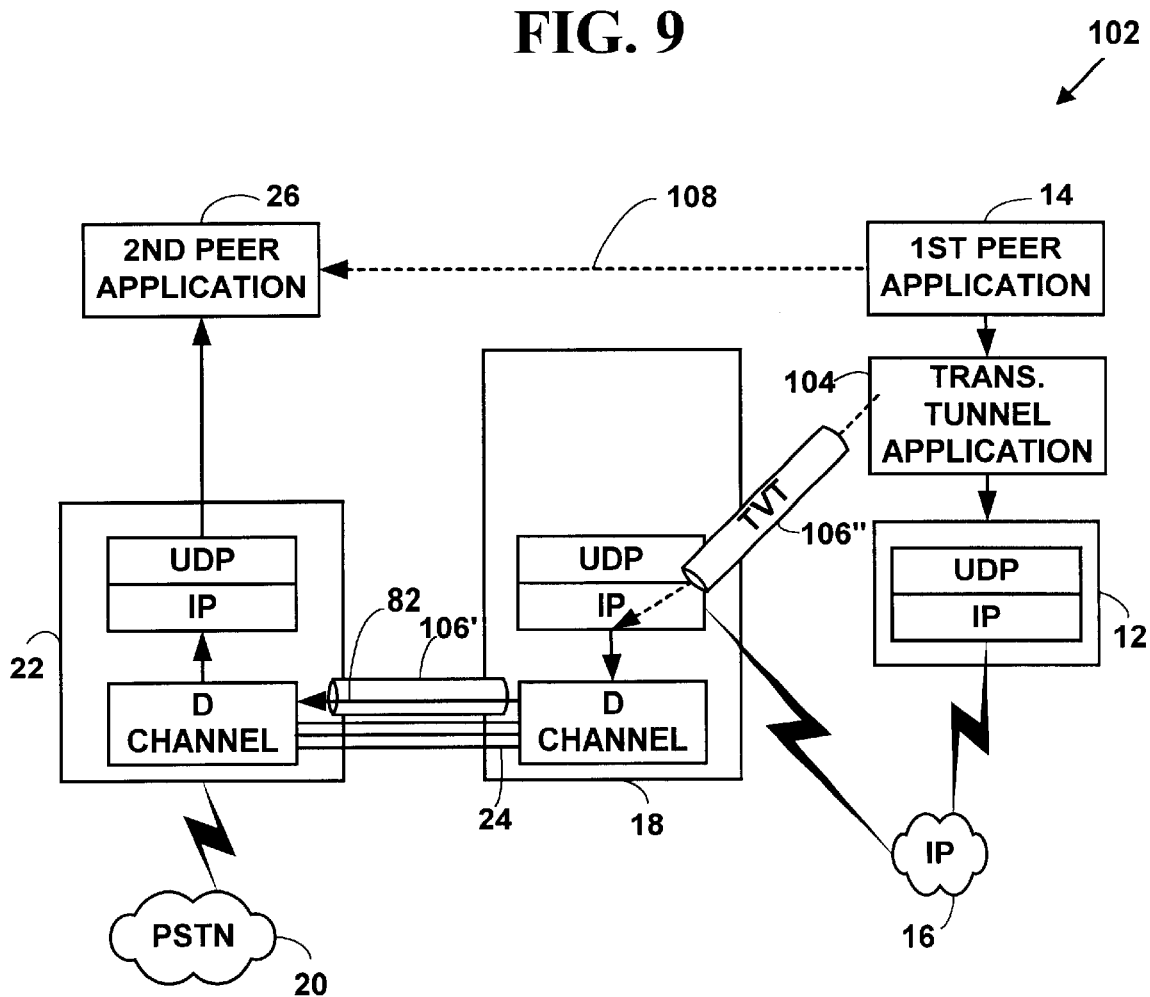
FIG. 9 is a block diagram illustrating an exemplary data flow for reflexive tunneling with transparent virtual tunnels.

FIG. 9 is a block diagram illustrating an exemplary data flow 102 for reflexive tunneling with transparent virtual tunnels using Method 90 (FIG. 8). At Step 92, a data packet is received from a second peer application 26 associated with a third network device 22 via a second network device 18, over a transparent virtual tunnel, on a first peer application 14 associated with a first network device 12 on a first network 16.

Table 10 illustrates an exemplary UDP/IP data packet received from the second network device 18 on the first peer application 14. However, other data packet layouts and other protocols could also be used.

TABLE 10

| IP header | | UDP header | | Data |
| --- | --- | --- | --- | --- |
| Destination IP address Of first network device 12 | Source IP address of pre-determined communications channel 82 | Destination UDP port 'P1' of 1st peer application 14 | Source UDP port 'P3' of 2nd Peer application 26 | (e.g., e-mail) |

At step 94, a response data packet is addressed on the first peer application 14 associated to the second peer application 26. Table 11 illustrates an exemplary UDP/IP data packet addressed on the first peer application 14. However, other data packet layouts and other protocols could also be used.

TABLE 11

| IP header | | UDP header | | Data |
| --- | --- | --- | --- | --- |
| Destination IP address of pre-determined communications channel 82 | Source IP address of 1st network device 12 | Destination UDP port 'P3' of 2nd peer application 26 | Source UDP port 'P1' of 1st peer application 14 | (e.g., e-mail response) |

A network address in a header for the response data packet is a pre-determined communications channel 82 (FIG. 9) between the third network device 22 and a second network device 18 on the second network 20. The pre-determined communications channel forms a first segment 106' (FIG. 9) of the transparent virtual tunnel. A network port in a header for the response data packet is a network port for the second peer application 26.

At step 96, additional headers are added to the response data packet on the first network device 12 (e.g., with a transparent tunnel application 104 (FIG. 9)) to create a second segment 106" of transparent virtual tunnel (FIG. 9) between the first network device 12 on the first network 16 and the second network device 18 on the second network 20.

Table 12 illustrates an exemplary transparent virtual tunnel created with an encapsulated IP-in-IP data packet on the first network device 12 for the second segment 106" (FIG. 9) of the transparent virtual tunnel. However, other data packet layouts and other protocols could also be used. In addition, the present invention is not limited to IP-in-IP tunneling and other virtual tunneling protocols could also be used.

TABLE 11

| Transparent Tunnel IP header | | Transparent Tunnel UDP header | | Tunneled IP packet data |
| --- | --- | --- | --- | --- |
| Destination IP address of second network device 18 | Source IP address of first network device 12 | Destination UDP port 'P2' of 1$^{st}$ peer application 26 | Source UDP Port 'P5' of transparent virtual tunnel application 104 | Data packet as illustrated by Table 10 |

The data packet for the transparent virtual tunnel illustrated in Table 11 includes a source network address for the second network device 18. The data packet also includes a source network port for the transparent tunnel application 104 (FIG. 9) on the first network device 12. The tunneled IP packet data illustrated in Table 9 includes the data packet illustrated in Table 10, which includes a source network address for the pre-determined communications channel 82 which is the first segment 106' of the transparent virtual tunnel (FIG. 9) and a source network port for the first peer application 14.

At step 98, the response data packet is sent from the first network device 12 to the second network device 18 over the second segment 106" (FIG. 9) of transparent virtual tunnel using the tunneled data packet illustrated in Table 11. When the second network device 18 receives the data packet illustrated in Table 11, the transparent virtual tunnel header is stripped off leaving the data packet illustrated in Table 10.

At step 100, the response data packet is sent from the second network device 18 to the third network device 22 using the pre-determined communications channel 82 from a header for the response data packet over the first segment 106' (FIG. 9) of the transparent virtual tunnel. The third network device 22 forwards the response data packet to the second peer application 26. Thus, peer applications associate directly with a network device with a number of communications channels receive communicate "directly" 108 (FIG. 9) from another peer application without confusion using a transparent virtual tunnel with multiple segments.

Reflexive tunneling with transparent virtual tunneling with multiple segments may allow peer applications on a network device that may include multiple communication channels on a communications link to several independent network devices to communicate with other peer applications on other independent devices without confusion. In addition, reflexive tunneling with transparent virtual tunnels with multiple segments may also allow supplemental services to be added to a network device in less time, with less expense.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements and different component types may be used in the block diagrams.

The claims should not be read as limited to the described order or elements unless stated to that effect. Therefore, all embodiments that come within the scope and spirit of the following claims and equivalents thereto are claimed as the invention.

We claim:

1. A method of reflexive tunneling, comprising the following steps:

receiving a data packet on a second network device on a second network, from a first peer application associated with a first network device on a first network, for a second peer application associated with a third network device on the second network, wherein a first destination address in a first header in the data packet for the third network device was selected from a published list of network addresses and a first destination port in a second header in the data packet for the second peer application was selected from a published list of network ports and, wherein the selected first destination address and the selected first destination port directed the data packet to a hidden tunnel application on the second network device on the second network instead of to the second peer application associated with the third network device on the second network;

selecting a communications channel on a communications link between the second network device and the third network device;

modifying one or more headers in the data packet on the second network device to create a hidden virtual tunnel between the second network device and the third network device by:

replacing the first destination address for the second network device in the first header with a second network destination address for the selected communications channel on the communications link between the second network device and the third network device, and replacing the first destination port for the hidden tunnel application on the second network device in the second header with a second destination port for the second peer application on the third network device, wherein the one or more modified headers provide communication state information, and wherein the hidden virtual tunnel is hidden from the first peer application associated with the first network device and the second peer application associated with the third network device; and forwarding the data packet from the second network device to the third network device over the hidden virtual tunnel using the selected communications channel.

2. A computer readable medium having stored therein instructions for causing a central processing unit to execute the method of claim 1.

3. The method of claim 1 wherein the second network device is an edge server.

4. The method of claim 1 wherein the third network device is a telephony switch.

5. The method of claim 1 wherein the step of modifying one or more headers in the data packet includes modifying one or more headers from the hidden tunnel application on the second network device.

6. The method of claim 5 wherein the headers include User Datagram Protocol headers and Internet Protocol headers.

7. The method of claim 1 wherein the communications channel is an Integrated Services Digital Network D-channel on a Integrated Services Digital Network communications link between the second network device and the third network device.

8. The method of claim 1 wherein the first and second destination addresses are Internet Protocol Addresses and the first and second destination ports are User Datagram Protocol Ports.

9. The method of claim 1 further comprising:
receiving the data packet over the hidden virtual tunnel on the third network device; and
forwarding the data packet to the second peer application on the third network device.

10. The method of claim 1 wherein the communication state information includes any of a network address, a network port or selected communication channel information.

11. The method of claim 1 further comprising:
receiving a data packet on the third network device on the second network, from the second peer application associated with the third network device, for the first peer application associated with the first network device on the first network;
selecting a communications channel on a communications link between the third network device and a second network device on the second network;
forwarding the data packet from the third network device to the second network device over the selected communications channel;
modifying the one or more headers in the data packet on the second network device to create a hidden virtual tunnel between the second network device on the second network and the first network device on the first network, wherein the one or more modified headers provide communication state information, and wherein the hidden virtual tunnel is hidden from the second peer application associated the third network device and the first peer application associated with the first network device; and
forwarding the data packet from the second network device to the first network device over the hidden virtual tunnel.

12. A computer readable medium having stored therein instructions for causing a central processing unit to execute the method of claim 11.

13. The method of claim 11 further comprising the following steps:
receiving the data packet over the hidden virtual tunnel on the first network device from the second network device; and
forwarding the data packet from the first network device to the first peer application.

14. The method of claim 1, wherein the step of modifying the one or more headers in the data packet on the second network device include, modifying the one or more headers from the hidden tunnel application on the second network device.

15. A method of reflexive tunneling, comprising the following steps:
selecting a network port for a second peer application associated with a third network device on a second network, on a first peer application associated with a first network device on first network, from a list of network ports, wherein the network port published in the list of network ports for the second peer application is a network port for a hidden tunnel application on a second network device on the second network;
selecting a network address for a third network device on the first peer application from a list of network addresses, wherein the network address published in the list of network addresses for the third network device is a network address for the second network device; and
sending data packets from the first peer application to the second peer application using the selected network port and selected network address, wherein the data packets are sent from the first peer application associated with the first network device to the hidden tunnel application on the second network device, and wherein the hidden tunnel application on the second network device sends the data packets to the second peer application associated the third network device using a hidden virtual tunnel.

16. A computer readable medium having stored therein instructions for causing a central processing unit to execute the method of claim 15.

17. A method of reflexive tunneling, comprising the following steps:
receiving a data packet from a second peer application associated with a third network device on a second network, on the third network device, for a first peer application associated with a first network device on a first network, wherein a header in the data packet includes a network address for a pre-determined communications channel between the third network device and a second network device on which the data packet is to be sent;
sending the data packet from the third network device to a second network device on the second network over the pre-determined communications channel between the third network device and the second network device identified by the network address included in the header in the data packet, thereby creating a first segment of a transparent virtual tunnel;
adding additional headers to the data packet on the second network device, thereby creating a second segment of the transparent virtual tunnel between the second network device on the second network and the first network device on the first network;
sending the data packet from the second network device to the first network device over the second segment of transparent virtual tunnel;
receiving the data packet on the first peer application associated with the first network device;

sending a response data packet from the first peer application to the second peer application via the second segment of the transparent virtual tunnel between the first network device and the second network device and via the first segment of the transparent virtual tunnel over the pre-determined communications channel between the second network device and the third network device.

18. A computer readable medium having stored therein instructions for causing a central processing unit to execute the method of claim 17.

19. A method of reflexive tunneling, comprising the following steps:

receiving a data packet from a second peer application associated with a third network device on a second network, via a second network device on the second network, over a transparent virtual tunnel with multiple segments, on a first peer application associated with a first network device on a first network;

addressing a response data packet from the first peer application associated with the first network device on the first network, to the second peer application associated with the third network device on the second network, wherein a network address in a header for the response data packet is a pre-determined communications channel for a first segment of the transparent virtual tunnel between the third network device and a second network device on the second network;

adding additional headers to the response data packet on the first network device to create a second segment of the transparent virtual tunnel between the first network device on the first network and the second network device on the second network;

sending the response data packet from the first network device to the second network device over the second segment of the transparent virtual tunnel; and sending the response data packet from the second network device to the third network device over the first segment of the transparent virtual tunnel using the pre-determined communications channel from the header for the response data packet.

20. A computer readable medium having stored therein instructions for causing a central processing unit to execute the method of claim 19.

21. The method of claim 19 further comprising:

receiving the response data packet on the third network device over the pre-determined communications channel on the first segment of the transparent virtual tunnel from the second network device; and forwarding the response data packet to the second peer application associated with the third network device.

22. A system for reflexive tunneling, comprising:

a hidden virtual tunnel, for sending data packets from a first peer application associated with a first network device on a first network, to a second peer application associated with a third network device on a second network, wherein the hidden virtual tunnel is hidden from the first peer application and the second peer application, and wherein the hidden virtual tunnel is created by modifying headers in the data packets; and a hidden tunnel application, for creating a hidden virtual tunnel between two network devices by modifying headers in the data packets received from a peer application on the hidden tunnel application by:

replacing a first destination address in a data packet for a network device associated with the virtual tunnel application in a first header with a second destination address for a selected communications channel on a communications link between the two network devices, and replacing a first destination port in a data packet for the hidden tunnel application in a second header with a second destination port for a selected peer application, wherein the first destination address in the first header in the data packet for the third network device was selected from a published list of network addresses and the first destination port in the second header in the data packet for the second peer application was selected from a published list of network ports and, wherein the selected first destination address and the first destination port direct the data packet to the hidden tunnel application instead of the second peer application associated with the third network device on the second network.

* * * * *